(12) United States Patent
Ono

(10) Patent No.: US 7,596,440 B2
(45) Date of Patent: Sep. 29, 2009

(54) STEERING APPARATUS AND STEERING RATIO CONTROL METHOD FOR AUTOMOTIVE VEHICLE

(75) Inventor: Hitoshi Ono, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 896 days.

(21) Appl. No.: 11/127,288

(22) Filed: May 12, 2005

(65) Prior Publication Data
US 2005/0263339 A1    Dec. 1, 2005

(30) Foreign Application Priority Data
May 31, 2004    (JP)    ............... 2004-160936

(51) Int. Cl.
*A01B 69/00*    (2006.01)

(52) U.S. Cl. ............... 701/41; 701/1; 701/36; 701/42; 180/400; 180/408; 180/412; 180/422; 180/443; 280/29; 280/80.1; 280/93.502; 280/93.513; 280/280; 475/149; 475/153; 74/640

(58) Field of Classification Search ............... 701/41, 701/1, 36, 42; 280/29, 80.1, 93.502, 93.513, 280/280, 771; 475/149, 153; 74/640; 180/400, 180/408, 412, 417, 421, 422, 443, 446
See application file for complete search history.

(56) References Cited

U.S. PATENT DOCUMENTS

| | | | | | |
|---|---|---|---|---|---|
| 4,441,572 | A | * | 4/1984 | Ito et al. | ............... 180/415 |
| 4,896,737 | A | * | 1/1990 | Kanazawa et al. | ............... 180/414 |
| 4,977,507 | A | * | 12/1990 | Matsuoka et al. | ............... 701/43 |
| 5,267,625 | A | * | 12/1993 | Shimizu | ............... 180/443 |
| 5,284,219 | A | * | 2/1994 | Shimizu et al. | ............... 180/444 |
| 5,878,360 | A | * | 3/1999 | Nishino et al. | ............... 701/41 |
| 6,013,994 | A | * | 1/2000 | Endo et al. | ............... 318/432 |
| 6,102,151 | A | * | 8/2000 | Shimizu et al. | ............... 180/446 |
| 6,705,420 | B2 | | 3/2004 | Ono et al. | |
| 6,945,353 | B2 | * | 9/2005 | Bishop | ............... 180/446 |
| 7,143,864 | B2 | * | 12/2006 | Mattson et al. | ............... 180/446 |
| 2004/0060765 | A1 | * | 4/2004 | Mattson et al. | ............... 180/422 |

FOREIGN PATENT DOCUMENTS

| | | |
|---|---|---|
| EP | 1 304 276 A1 | 4/2003 |
| EP | 1 419 952 A2 | 5/2004 |
| JP | 11-099956 A | 4/1999 |
| JP | 2003-182622 A | 7/2003 |

* cited by examiner

*Primary Examiner*—Khoi Tran
*Assistant Examiner*—McDieunel Marc
(74) *Attorney, Agent, or Firm*—Foley & Lardner LLP

(57) ABSTRACT

A steering apparatus for an automotive vehicle is provided with an electric drive unit that varies a steering ratio between a road wheel angle and a steering wheel angle of the vehicle, a temperature sensor that detects a temperature of the electric drive unit, and a control unit including a steering ratio characteristic setting block that sets a characteristic of the steering ratio including a steering gain and a steering response rate in accordance with an operating state of the vehicle and, when the temperature of the electric drive unit exceeds a first temperature threshold, adjusts the steering response rate in such a manner that the steering response rate comes closer to a base steering response rate level as the temperature of the electric drive unit becomes increased and a drive block that drives the electric drive unit to vary the steering ratio according to the steering ratio characteristic.

13 Claims, 5 Drawing Sheets

STEERING APPARATUS AND STEERING RATIO CONTROL METHOD FOR AUTOMOTIVE VEHICLE

BACKGROUND OF THE INVENTION

The present invention relates to a steering apparatus for an automotive vehicle, which has an electric drive unit such as an electric motor to vary a steering ratio, or steering gain, (an angle ratio between a steering wheel angle and a road wheel angle) of the vehicle. The present invention also relates to a steering ratio, or steering gain, control method for an automotive vehicle.

Japanese Laid-Open Patent Publication No. 2003-182622 proposes a steering apparatus for an automotive vehicle that is equipped with an electric motor to vary a steering ratio of the vehicle according to a steering ratio characteristic. There is a possibility that the electric motor receives a large electric current and gets overheated e.g. when the steering wheel is held or turned repeatedly to a steering lock position. In order to prevent such motor overheating, the above-proposed steering apparatus adjusts a steering gain R of the steering ratio characteristic in response to a temperature increase in the motor in such a manner that the steering gain comes closer to its base level Rc (at which the steering gain R stands under no steering ratio control) as shown in FIG. 6.

SUMMARY OF THE INVENTION

In the above-proposed steering apparatus, however, the steering gain, or steering ratio, R basically takes on values close to the base level Rc in a middle vehicle speed range, whereby the amount of adjustment of the steering gain R is small even if the motor exceeds an overheat protection temperature threshold Tth. This results in little overheat protection effect on the motor.

It is therefore an object of the present invention to provide a steering apparatus for an automotive vehicle in which an electric drive unit e.g. electric motor can be protected from overheating regardless of an operating state of the vehicle.

It is also an object of the present invention to provide a steering ratio control method for an automotive vehicle.

According to a first aspect of the invention, there is provided a steering apparatus for an automotive vehicle, comprising: an electric drive unit that varies a steering ratio between a road wheel angle and a steering wheel angle of the vehicle; a temperature sensor that detects a temperature of the electric drive unit; and a control unit including: a steering ratio characteristic setting block that sets a characteristic of the steering ratio including a steering gain and a steering response rate in accordance with an operating state of the vehicle and, when the temperature of the electric drive unit exceeds a first temperature threshold, adjusts the steering response rate in such a manner that the steering response rate comes closer to a base steering response rate level as the temperature of the electric drive unit becomes increased; and a drive block that drives the electric drive unit to vary the steering ratio according to the steering ratio characteristic.

According to a second aspect of the invention, there is provided a steering apparatus for an automotive vehicle, comprising: an electric drive unit capable of varying a steering ratio between a road wheel angle and a steering wheel angle of the vehicle; means for detecting a traveling speed of the vehicle; means for detecting a temperature of the electric drive unit; means for setting a steering ratio characteristic including a steering gain and a steering response rate in accordance with the vehicle traveling speed; means for judging whether the temperature of the electric drive unit exceeds a given temperature threshold; means for changing the steering response rate from a normal control level to an overheat protection control level when the temperature of the electric drive unit exceeds the given temperature threshold; and means for generating a drive signal to the electric drive unit so that the drive unit varies the steering ratio according to the steering ratio characteristic.

According to a third aspect of the invention, there is provided a steering ratio control method for an automotive vehicle, comprising: the vehicle having an electric drive unit capable of varying a steering ratio between a road wheel angle and a steering wheel angle of the vehicle, the control method comprising: detecting a traveling speed of the vehicle; detecting a temperature of the electric drive unit; setting a steering ratio characteristic including a steering gain and a steering response rate in accordance with the vehicle traveling speed; judging whether the temperature of the electric drive unit exceeds a given temperature threshold; changing the steering response rate from a normal control level to an overheat protection control level when the temperature of the electric drive unit exceeds the given temperature threshold; and generating a drive signal to the electric drive unit so that the drive unit varies the steering ratio according to the steering ratio characteristic.

The other objects and features of the invention will also become understood from the following description.

DESCRIPTION OF THE EMBODIMENTS

The present invention will be described below with reference to the attached drawings.

Figure 1:
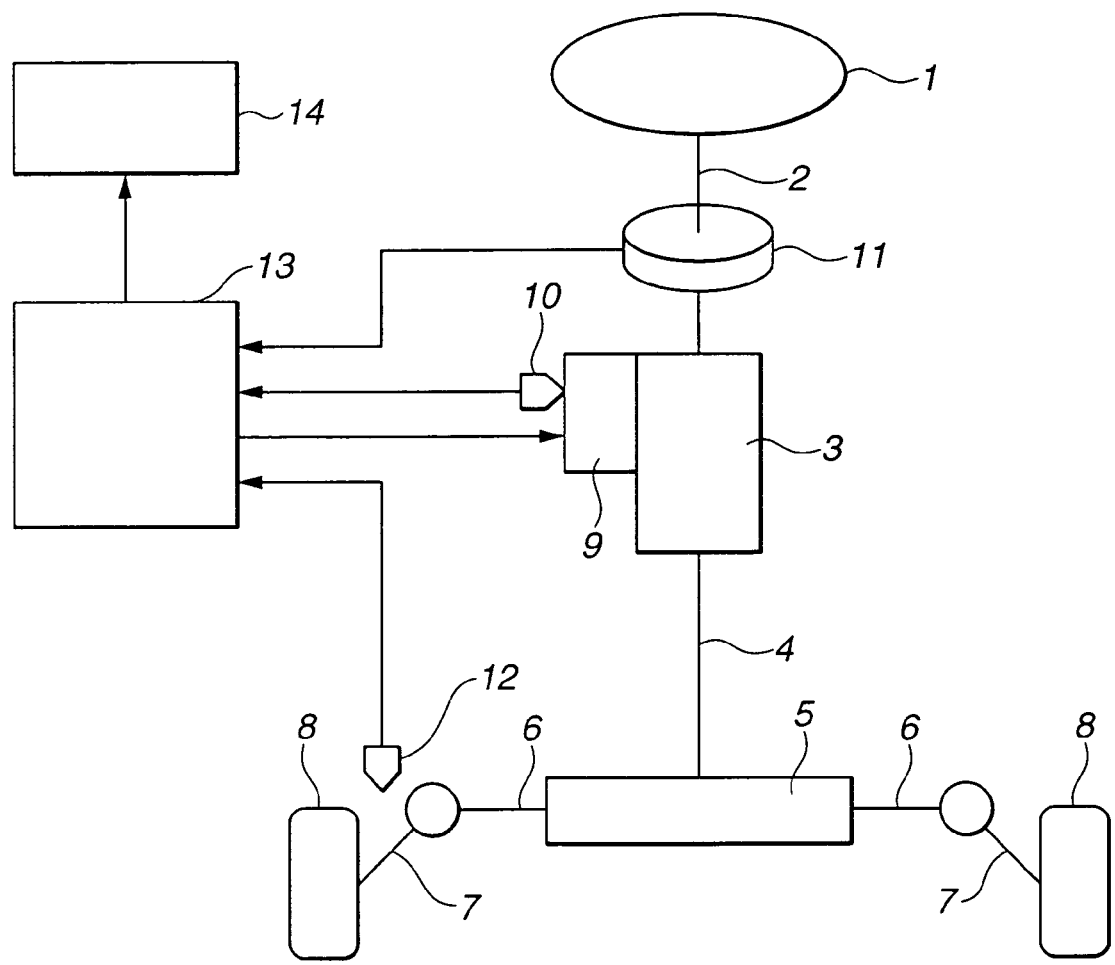
FIG. 1 is a block diagram of a vehicle steering apparatus according to one exemplary embodiment of the invention.

Referring to FIG. 1, there is provided according to one exemplary embodiment of the invention a steering apparatus for controlling road wheels 8 of an automotive vehicle in response to a driver's steering operation, which includes driver-operated steering wheel 1, steering shaft 2, variable steering ratio mechanism 3, pinion shaft 4, steering gear 5, tie rod 6, knuckle arm 7, control unit 13 and warning unit 14. It is noted that, although the vehicle has four road wheels 8, only front wheels 8 are shown in FIG. 1.

Steering wheel 1 is connected to an input side of variable steering ratio mechanism 3 via steering shaft 2, whereas road wheels 8 are connected to an output side of variable steering ratio mechanism 3 via pinion shaft 4, steering gear 5, tie rods 6 and knuckle arms 7.

Variable steering ratio mechanism 3 has electric motor 9 as an electric drive unit operated under the control of control unit 13 to vary a steering ratio of the vehicle, which is defined as a ratio of a steered angle δm of road wheels 8 (hereinafter just referred to as "road wheel angle") to a steering angle θs of steering wheel 1 (hereinafter just referred to as "steering wheel angle"). The rotational angle and direction of electric motor 9 are monitored with a rotary encoder.

The method of varying the steering ratio is not particularly restricted, and the steering ratio can be varied by a known method. For example, variable steering ratio mechanism 3 has an input shaft connected to steering wheel 1 with an input shaft center being displacable in a predetermined range (from A0 to A2) and an output shaft connected to road wheels 8, so as to change an eccentricity between the input and output shafts and thereby produce a relative rotational angle difference between the input and output shafts, as disclosed in Japanese Laid-Open Patent Publication No. 11-99956, such that the steering ratio becomes varied within a predetermined range (from R0 to R2) in response to a displacement of the input shaft center of variable steering ratio mechanism 3 under the rotational power of electric motor 9.

There is further provided in the vehicle, as shown in FIG. 1, motor temperature sensor 10 mounted to electric motor 9 to detect an temperature Tm of electric motor 9 (hereinafter referred to "motor temperature"), steering wheel angle sensor 11 mounted to steering shaft 2 to detect steering wheel angle θs, vehicle speed sensor 12 to detect a traveling speed V of the vehicle (hereinafter referred to as "vehicle speed") based on a wheel speed of any one of four road wheels 8. These sensors 10 to 12 are connected with control unit 13 so that control unit 13 receives input about motor temperature Tm, steering wheel angle θs and vehicle speed V.

Control unit 13 is comprised of e.g. a microcomputer and programmed to, upon receipt of the detection signals from sensors 10 to 12, set a steering ratio characteristic of the vehicle as a function of two factors i.e. steering ratio, or steering gain, R and steering response rate $\tau$ according to an operating state of the vehicle (such as vehicle speed V), determines a target steering ratio (δm /θs) based on the steering ratio characteristic, and then, generates a control command to causes electric motor 9 to achieve the target steering ratio. By way of example, control unit 13 may have a memory that stores therein steering ratio, or steering gain, and response rate characteristic maps so as to retrieve steering ratio, or steering gain, R and steering response rate $\tau$ from the respective characteristic maps in accordance with the vehicle operating state, or may obtain steering ratio, or steering gain, R and steering response rate $\tau$ by calculation in accordance with the vehicle operating state.

Control unit 13 is also programmed to perform motor overheat protection control depending on motor temperature Tm in order to prevent the overheating of electric motor 9 under the steering ratio control. During the motor overheat protection control, control unit 13 actuates warning unit 14 to give warning to a driver when motor temperature Tm exceeds maximum operating temperature limit Tmax of electric motor 9.

Figure 2:
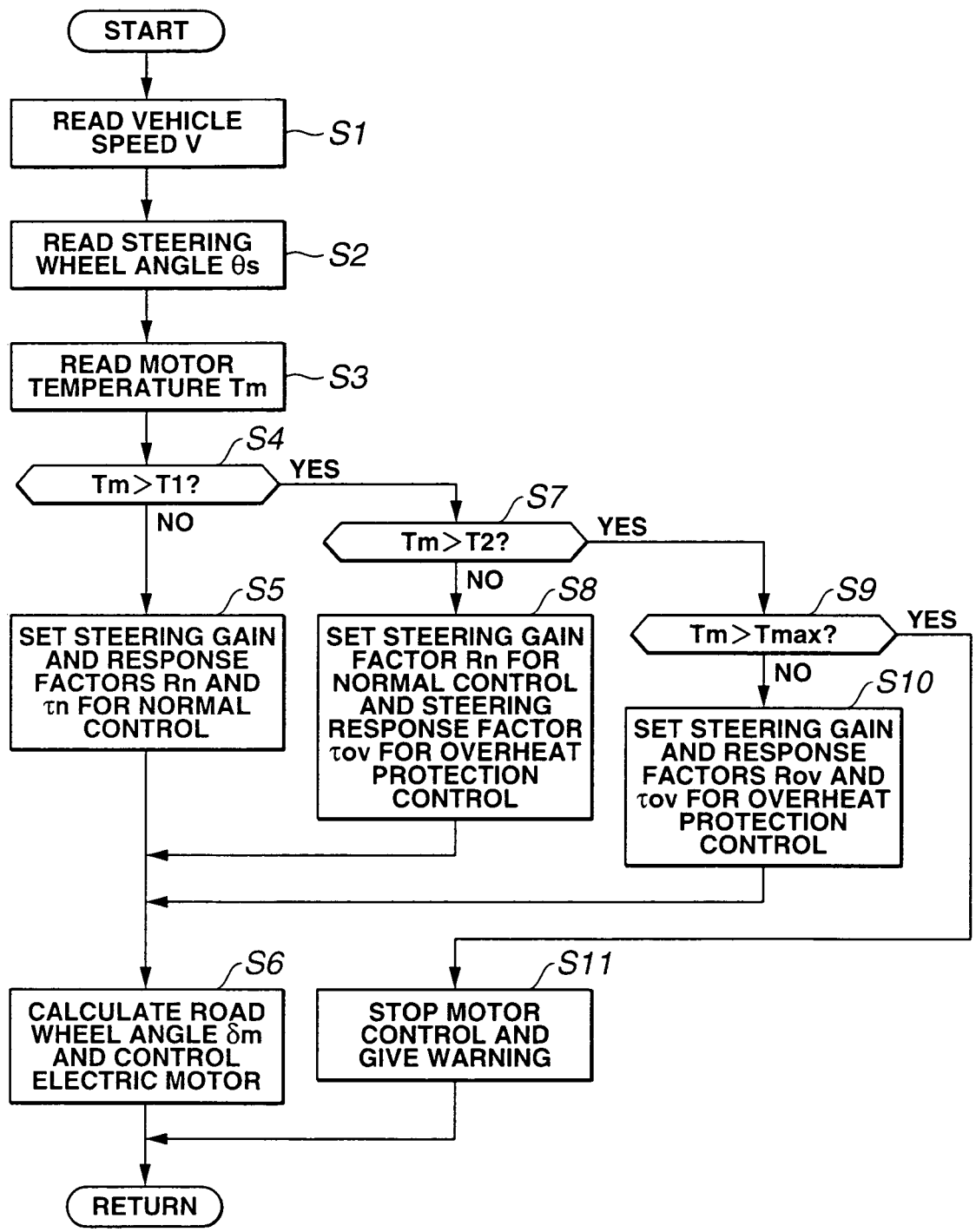
FIG. 2 is a flowchart of motor overheat protection control executed by the steering apparatus according to one exemplary embodiment of the invention.

Referring to FIG. 2, the motor overheat protection control is carried out through the following program execution in the present embodiment.

First, control unit 13 reads at step S1 vehicle speed V from vehicle speed sensor 12.

Next, control unit 13 reads at step S2 steering wheel angle θs from steering wheel angle sensor 11.

Then, control unit 13 reads at step S3 motor temperature Tm from motor temperature sensor 10.

At step S4, control unit 13 judges whether motor temperature Tm exceeds first temperature threshold T1. If No at step S4, the program control proceeds to step S5. If Yes at step S4, the program control proceeds to step S7.

First temperature threshold T1 is preferably set to a temperature value up to which the operating life of electric motor 9 does not become adversely affected. For the reason that the overheating of electric motor 9 is highly likely to occur due to continuous stationary steering in the low vehicle speed range, it is preferable that first temperature threshold T1 decreases with vehicle speed V.

At step S5, control unit 13 set steering ratio, or steering gain, R and steering response rate $\tau$ to respective normal control levels Rn and $\tau$n according to vehicle speed V. The program control then proceeds to step S6.

Steering ratio, or steering gain, Rn for normal control is made higher than base gain level Rc when the vehicle is in a low speed range, made closer to base gain level Rc when the vehicle is in a middle speed range, and made lower than base gain level Rc when the vehicle is in a high speed range. Steering response rate $\tau$n for normal control is made higher than base response level $\tau$c as vehicle speed V is decreased. Base gain level Rc and base response level $\tau$c are herein taken as conventidnal levels of steering gain R and steering response rate $\tau$ under no steering ratio, or steering gain, control, respectively. Namely, steering ratio, or steering gain, and response factors Rn and $\tau$n for normal control are both set to high levels so as to increase the steering ratio and thereby reduce driver's steering effort when the vehicle is in the low speed range, and then, set to low levels so as to decrease the steering ratio and thereby prevent excessively quick or prompt vehicle motion when the vehicle is in the high speed range. This makes it possible to secure turning performance in a stationary (static) steering state and to improve vehicle stability in a high-speed vehicle traveling state. These normal control factors Rn and in remain constant independently of motor temperature Tm.

At step S6, control unit 13 determines a target value of road wheel angle δm based on steering wheel angle θs, steering ratio, or steering gain, R and steering response rate $\tau$ and then generates a drive signal to electric motor 9 to drive electric motor 9 in such a manner as to achieve the determined road wheel angle δm. The road wheel angle δm is herein given by the following expression:

$$\delta m = (R-1) \times \theta s + \tau \times s \times \theta s$$

where R is steering ratio, or steering gain; θs is steering wheel angle; $\tau$ is steering response rate; and s is Laplace operator.

At step S7, control unit 13 judges whether motor temperature Tm exceeds second temperature threshold T2 that is higher than first temperature threshold T1. If No at step S7, the program control proceeds to step S8. If Yes at step S7, the program control proceeds to step S9.

Second temperature threshold T2 is preferably set lower than a temperature value at which the steering apparatus becomes unable to prevent a temperature increase in electric motor 9 only by adjustments to steering response rate $\tau$. It is also preferable that second temperature threshold T2 decreases with vehicle speed V for the reason that the overheating of electric motor 9 is highly likely to occur due to continuous stationary steering in the low vehicle speed range.

At step S8, control unit 13 sets steering ratio, or steering gain, R to normal control level Rn according to vehicle speed V, but sets steering response rate $\tau$ to overheat protection control level $\tau$ov according to vehicle speed V and motor temperature Tm.

Steering response rate τov for overheat protection control is made lower than steering response rate τn for normal control in such a manner that steering response rate τov for overheat protection control comes closer to base response level τc as motor temperature Tm is increased.

At step S9, control unit 13 judges whether motor temperature Tm exceeds motor operating temperature limit Tmax. If No at step S9, the program control proceeds to step S1. If Yes at step S9, the program control proceeds to step S11.

Preferably, motor operating temperature limit Tmax is set to a maximum allowable temperature value up to which electric motor 9 does not make an emergency stop instantaneously.

At step S10, control unit 13 not only sets steering response rate τ to overheat protection control level τov but sets steering ratio, or steering gain, R to overheat protection control level Rov according to vehicle speed V and motor temperature Tm.

Steering ratio level Rov for overheat protection control varies depending on motor temperature Tm in such a manner that steering ratio Rov for overheat protection control comes closer to base ratio level Rc than steering ratio Rn for normal control as motor temperature Tm is increased.

At step S11, control unit 13 causes electric motor 9 to make an emergency stop and actuates warning unit 14 to warn the driver of the occurrence of abnormal overheating of electric motor 9 by an audible alert or a display.

To sum up, the control operations of control unit 13 in the steering apparatus can be separated into the following four cases depending on motor temperature Tm.

When motor temperature Tm is lower than or equal to first temperature threshold T1, the program control goes through steps S1, S2, S3, S4, S5 and S6. Thus, control unit 13 sets steering ratio R and steering response rate τ to normal control levels τn and Rn at step S5, determines target road wheel angle δm based on these steering ratio and response factors Rn and τn, and then, actuates electric motor 9 to achieve target road wheel angle δm at step S6.

When motor temperature Tm is higher than first temperature threshold T1 and lower than or equal to second temperature threshold T2, the program control goes through steps S1, S2, S3, S4, S7, S8 and S6. In this case, control unit 13 sets steering ratio R to normal control level Rn and sets steering response rate τ to overheat protection control level τov at step S8, determines target road wheel angle δm based on these steering ratio and response factors Rn and τov, and then, actuates electric motor 9 to achieve target road wheel angle δm at step S6.

When motor temperature Tm is higher than second temperature threshold T2 and lower than or equal to motor operating temperature limit Tmax, the program control goes through steps S1, S2, S3, S4, S7, S9, S10 and S6. Control unit 13 thus sets steering ratio R and steering response rate τ to overheat protection control levels Rov and τov at step S10, determines target road wheel angle δm based on these steering ratio and response factors Rov and τov, and then, actuates electric motor 9 to achieve target road wheel angle δm at step S6.

When motor temperature Tm is higher than motor operating temperature limit Tmax, the program control goes through steps S1, S2, S3, S4, S7, S9 and S11. Thus, control unit 13 causes electric motor 9 to make an emergency stop and causes warning unit 14 to give warning to the driver at step S11 in this case.

Figure 5:
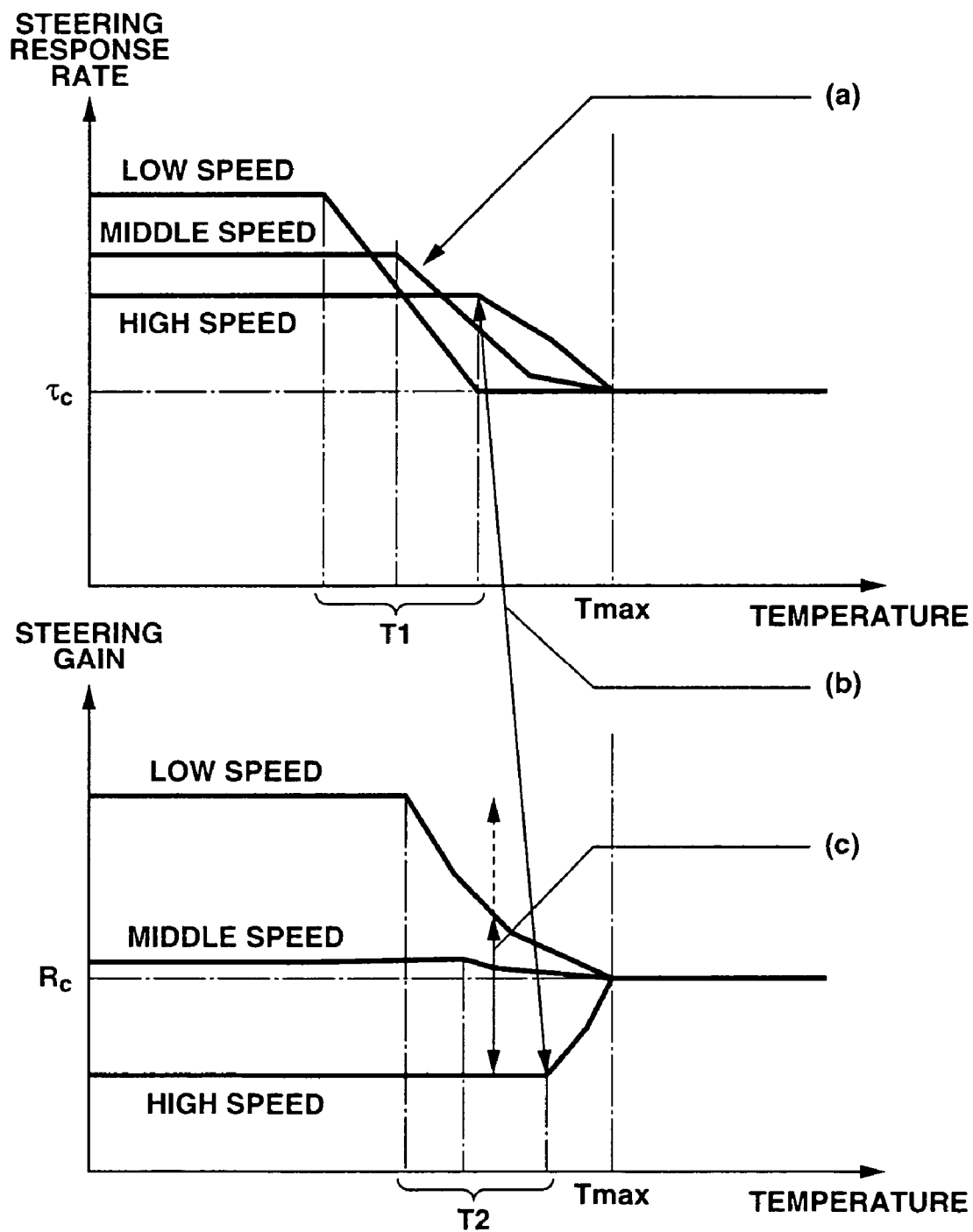
FIG. 5 is a diagram showing motor overheat protection effects according to one exemplary embodiment of the invention.

Accordingly, steering response rate τ is set constant (at normal control level τn) until motor temperature Tm reaches first temperature threshold T1 and then gradually decreased (from normal control level τn) toward base level τc as motor temperature Tm becomes higher than first temperature threshold T1, as shown in FIG. 5, under conditions of constant steady vehicle speed V. Under conditions of constant steady vehicle speed V, steering ratio R is set constant (at normal control level Rn) until motor temperature Tm reaches second temperature threshold T2 and then gradually, adjusted (from normal control level Rn) to base level Rc as motor temperature Tm becomes higher than second temperature threshold T2, as shown in FIG. 5.

Figure 3:
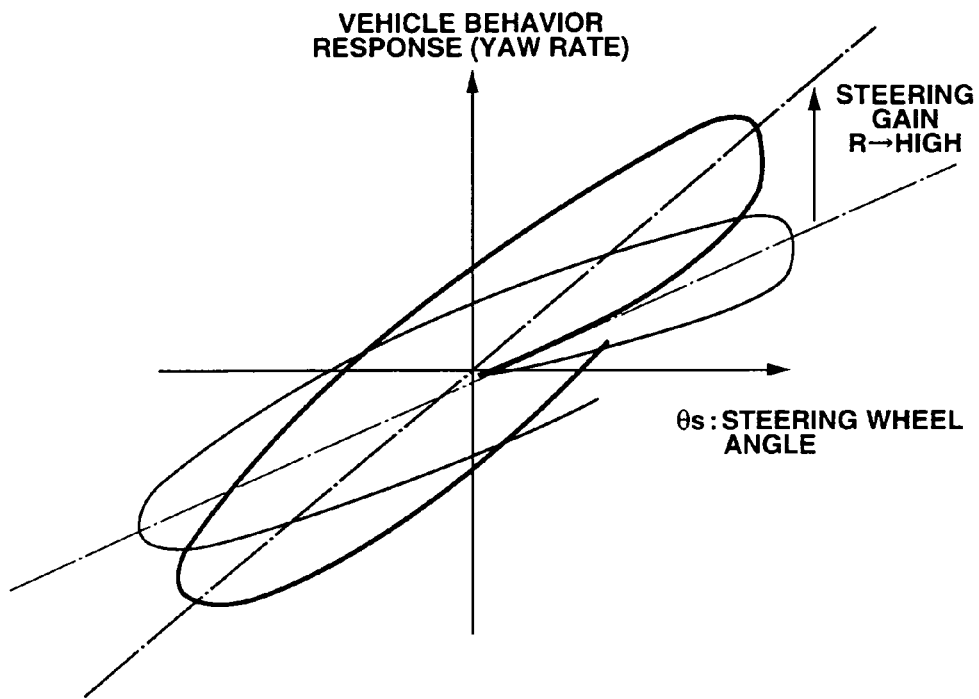
FIG. 3 is a vehicle characteristic control map showing a relationship between vehicle yaw rate and steering gain, or steering ratio, according to one exemplary embodiment of the invention.
Figure 4:
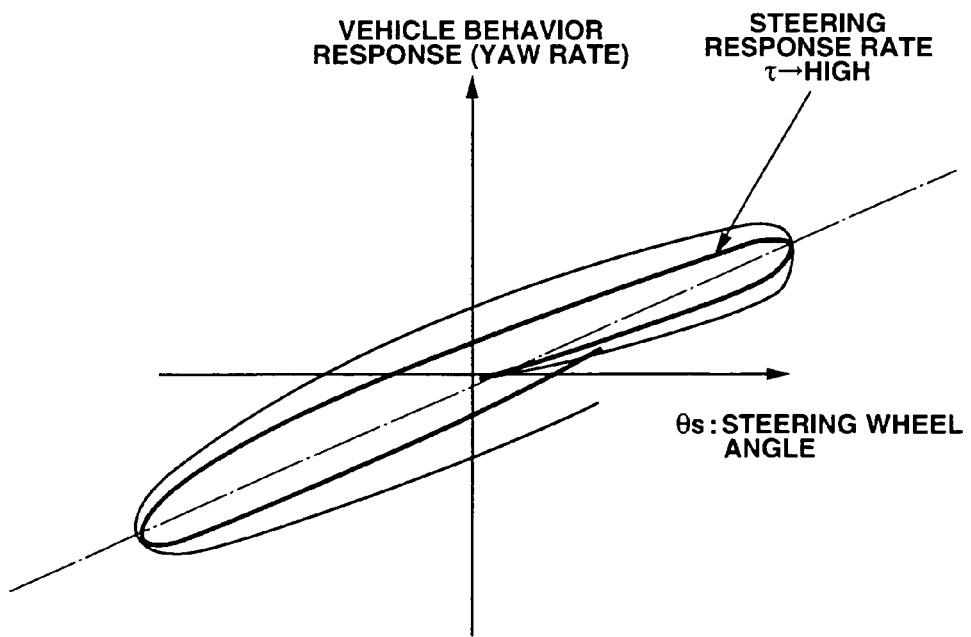
FIG. 4 is a vehicle characteristic control map showing a relationship between vehicle yaw rate and steering response rate according to one exemplary embodiment of the invention.

There is a difference in the effect on vehicle behavior response between adjusting steering ratio R and steering response rate τ. It is now assumed that steering wheel 1 is turned quickly in one direction and then in the other direction. The amount of change in vehicle yaw rate becomes large in proportion to steering ratio, or steering gain, R, as shown in FIG. 3, such that the vehicle behavior changes more greatly in response to increases in the steering ratio, or steering gain, R as shown in FIG. 3. This can results in much driver discomfort. The amount of change in vehicle yaw rate remains nearly the same such that the vehicle behavior does not change so greatly in response to variations in steering response rate τ, as shown in FIG. 4, thereby causing less driver discomfort.

Figure 6:
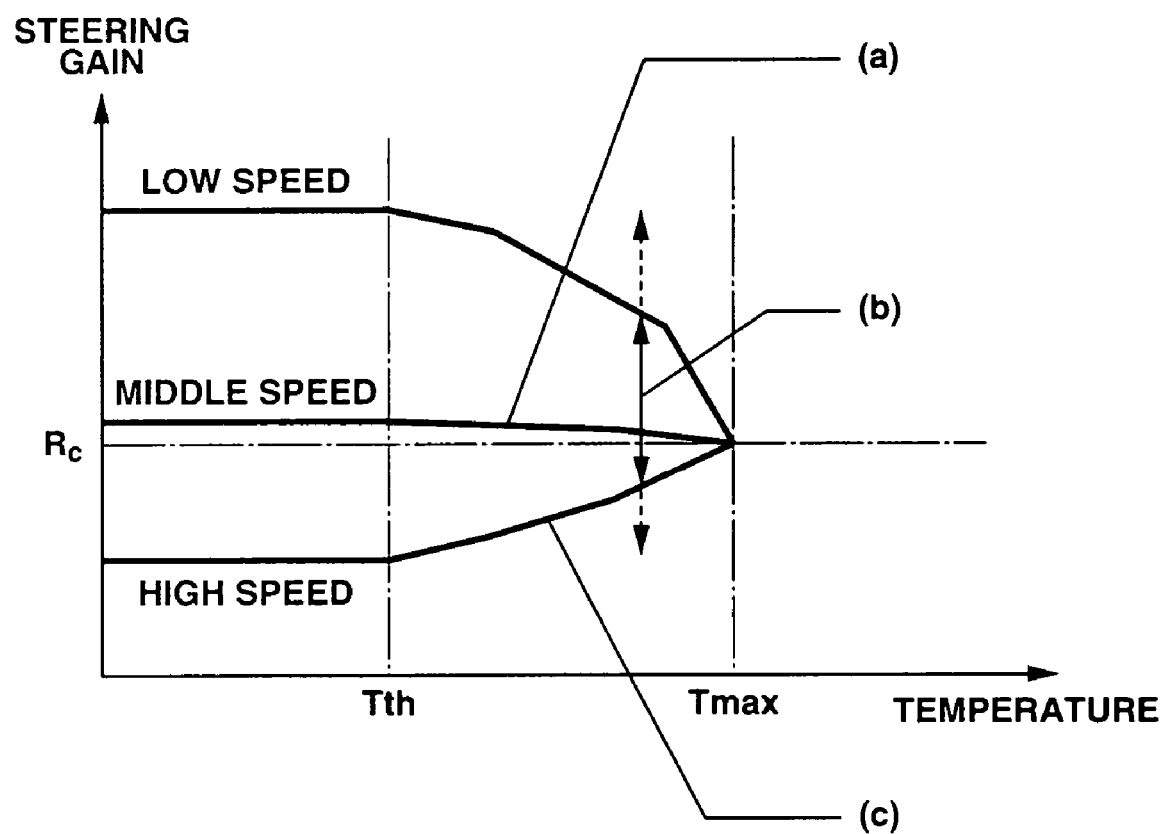
FIG. 6 is a diagram showing motor overheat protection effects according to the earlier technology.

As already discussed above, the steering ratio characteristic is set as a function of steering ratio, or steering gain, R (gear ratio) according to the earlier technology. For motor overheat protection under steering ratio control, steering ratio R is adjusted even in the earlier technology in such a manner that steering ratio R comes gradually closer to base level Rc when the motor temperture becomes higher than overheat protection temperature threshold Tth (corresponding to second temperature threshold T2 of the present embodiment) until after reaching maximum operating temperature limit Tmax as disclosed in Japanese Laid-Open Patent Publication No. 2003-182622 and as shown in FIG. 6. However, the earlier technology presents the following problems.

When the vehicle is in a middle speed range, steering ratio R basically takes on values close to base gain level Rc, as marked by line (a) in FIG. 6, so that the amount of adjustment of steering ratio R is small even if the electric motor is driven in such a manner as to risk the possibility of motor overheating. The load on the electric motor cannot be thus reduced to obtain a sufficient overheat protection effect on the motor in the earlier technology.

The steering ratio control cannot be performed appropriately in the earlier technology when the vehicle is accelerated or decelerated in response to a driver's operation, with the electric motor being overheated, so as to shift from the middle vehicle speed range to a high or low vehicle speed range as marked by line (b) in FIG. 6. This results in driver discomfort.

When the vehicle is in the high speed range, steering ratio R becomes increased in response to the overheating of electric motor 9 as marked by line (c) in FIG. 6 in the earlier technology. This also results in much driver discomfort.

On the other hand, the steering apparatus of the present embodiment is configured to not only adjust steering ratio R in such a manner that steering ratio R comes closer to base ratio level Rc but also adjust steering response rate τ in such a manner that steering response rate τ comes closer to base response level τc as marked by line (a) in FIG. 5. The load on electric motor 9 can be reduced due to decrease in steering response rate τ, so as to produce a sufficient overheat protection effect on electric motor 9 even if electric motor 9 is driven in such a manner as to risk the possibility of motor overheat in the middle vehicle speed range in the present embodiment. It is therefore possible to prevent the overheating of electric motor 9 assuredly regardless of the operation state of the vehicle. It is noted that, in the procedure of FIG. 2, the control in steps S4, S5 and S7-10 constitutes a steering ratio characteristic setting block, and the control in step S6 constitutes a motor driveblock.

Further, steering response rate τ is changed from normal control level τn to overheat protection control level τov at first temperature threshold T1, and then, steering ratio R is changed from normal control level Rn to overheat protection control level Rov at second temperature threshold T2 (higher than first temperature threshold T2), as marked by line (b) in FIG. 5. In other words, the steering response rate τ starts to be decreased gradually toward base response level τc before steering ratio R starts to be controlled toward base ratio level Rc. This makes it possible to minimize driver discomfort during the steering ratio and overheat protection control and to inform the driver that the steering apparatus is approaching its system limit with more safety.

First and second temperature thresholds T1 and T2 increase with vehicle speed V, as marked by line (c) in FIG. 5, such that both of steering ratio R and steering response rate τ start to be controlled at lower temperatures as the vehicle speed V becomes decreased in the present embodiment. Even if the vehicle undergoes hard acceleration with electric motor 9 being overheated, the steering apparatus can secure higher vehicle steering response as vehicle speed V becomes increased. This makes it possible to enhance the overheat protection effect on electric motor 9 during hard deceleration (in which the degree of emergency is low) and to enhance the steering response according to the driver's steering operation during high-speed traveling (in which the degree of emergency is high).

In addition, the steering characteristic is set so as to satisfy the expression: $\delta m=(R-1)\times\theta s+\tau\times s\times\theta s$ in the present embodiment. By adjusting both of steering ratio R and steering response rate τ according to vehicle speed V and motor temperature Tm, road wheel angle δm can be varied with steering wheel angle θs appropriately in response to the operation state of the vehicle.

When motor temperature Tm exceeds its operating temperature limit Tmax, electric motor 9 comes to an emergency stop. This makes it possible to prevent electric motor 9 from being burnt out due to abnormal motor overheating assuredly. It is noted that, in the procedure of FIG. 2, the control in step S11 constitutes a stop block.

The entire contents of Japanese Patent Application No. 2004-160936 (filed on May 31, 2004) are herein incorporated by reference.

Although the present invention has been described with reference to a specific embodiment of the invention, the invention is not limited to the above-described embodiment. Various modification and variation of the embodiment described above will occur to those skilled in the art in light of the above teaching.

For example, motor temperature Tm may alternatively be calculated from the electrical resistance between terminals of electric motor 9 i.e. the voltage or current between terminals of electric motor 9 although motor temperature sensor 10 is attached to electric motor 9 to detect motor temperature Tm directly by actual measurement in the above embodiment.

First and second temperature thresholds T1 and T2 are set lower as vehicle speed V becomes decreased in the above embodiment. However, at least one of first and second temperature thresholds T1 and T2 can alternatively be set to a fixed value.

The steering ratio control can be performed according to the operating state of the vehicle including not only vehicle speed V but also any other vehicle operational parameter or parameters, such as a vehicle yaw rate, a coefficient of friction between road surface and wheel tire and a vehicle acceleration or deceleration rate.

The scope of the invention is defined with reference to the following claims.

What is claimed is:

1. A steering apparatus for an automotive vehicle, comprising:
    an electric drive unit configured to vary a steering ratio between a road wheel angle and a steering wheel angle of the vehicle;
    a temperature sensor configured to detect a temperature of the electric drive unit; and
    a control unit including:
        a steering ratio characteristic setting block configured to set a characteristic of the steering ratio including the steering ratio and a steering response rate in accordance with an operating state of the vehicle and, when the temperature of the electric drive unit exceeds a first temperature threshold, is configured to adjust the steering response rate in such a manner that the steering response rate comes closer to a base steering response rate level as the temperature of the electric drive unit becomes increased; and
        a drive block configured to drive the electric drive unit to vary the steering ratio according to the steering ratio characteristic.

2. The steering apparatus as defined in claim 1, wherein the steering ratio characteristic setting block is configured to adjust the steering ratio in such a manner that, when the temperature of the electric drive unit exceeds a second temperature threshold higher than the first temperature threshold, the steering ratio comes closer to a base steering ratio level as the temperature of the electric drive unit becomes increased.

3. The steering apparatus as defined in claim 2, further comprising a vehicle speed sensor configured to detect a traveling speed of the vehicle, wherein the second temperature threshold decreases as the vehicle traveling speed becomes low.

4. The steering apparatus as defined in claim 1, further comprising a vehicle speed sensor configured to detect a traveling speed of the vehicle, wherein the first temperature threshold decreases as the vehicle traveling speed becomes low.

5. The steering apparatus as defined in claim 1, wherein the steering ratio characteristic is given by the following expression:

$$\delta m=(R-1)\times\theta s+\tau\times s\times\theta s$$

where δm is the road wheel angle; R is the steering ratio; θs is the steering wheel angle; τ is the steering response rate; and s is the Laplace operator.

6. The steering apparatus as defined in claim 1, wherein the control unit further includes a stop block configured to stop the electric drive unit when the electric drive unit exceeds a maximum operating temperature limit thereof.

7. The steering apparatus as defined in claim 1, wherein the electric drive unit is an electric motor.

8. A steering apparatus for an automotive vehicle, comprising:
    an electric drive unit capable of varying a steering ratio between a road wheel angle and a steering wheel angle of the vehicle;
    means for detecting a traveling speed of the vehicle;
    means for detecting a temperature of the electric drive unit;

means for setting a steering ratio characteristic including a steering ratio and a steering response rate in accordance with the vehicle traveling speed;

means for judging whether the temperature of the electric drive unit exceeds a given temperature threshold;

means for changing the steering response rate from a normal control level to an overheat protection control level when the temperature of the electric drive unit exceeds the given temperature threshold; and means for generating a drive signal to the electric drive unit so that the drive unit varies the steering ratio according to the steering ratio characteristic.

9. The steering apparatus as defined in claim 8, wherein the overheat protection control level of the steering response rate varies depending on the temperture of the electric drive unit in such a manner that the overheat protection control level of the steering response rate comes closer to a base level of the steering response rate than the normal control level of the steering response rate as the temperature of the electric drive unit becomes increased.

10. The steering apparatus as defined in claim 8, further comprising:

means for judging whether the temperature of the electric drive unit exceeds a second temperature threshold higher than the first mentioned temperature threshold; and means for changing the steering ratio from a normal control level to an overheat protection control level when the temperature of the electric drive unit exceeds the second temperature threshold.

11. The steering apparatus as defined in claim 10, wherein the overheat protection control level of the steering ratio varies depending on the temperature of the electric drive unit in such a manner that the overheat protection control level of the steering ratio comes closer to a base level of the steering ratio than the normal control level of the steering ratio as the temperature of the electric drive unit becomes increased.

12. The steering apparatus as defined in claim 8, further comprising:

means for judging whether the temperature of the electric drive unit exceeds a maximum operating temperature limit; and means for generating a stop signal so as to cause the electric drive unit to make an emergency stop when the temperature of the electric drive unit exceeds the maximum operating temperature limit.

13. A steering ratio control method for an automotive vehicle, the vehicle having an electric drive unit capable of varying a steering ratio between a road wheel angle and a steering wheel angle of the vehicle, the control method comprising:

detecting a traveling speed of the vehicle;

detecting a temperature of the electric drive unit;

setting a steering ratio characteristic including a steering ratio and a steering response rate in accordance with the vehicle traveling speed;

judging whether the temperature of the electric drive unit exceeds a given temperature threshold;

changing the steering response rate from a normal control level to an overheat protection control level when the temperature of the electric drive unit exceeds the given temperature threshold; and generating a drive signal to the electric drive unit so that the drive unit varies the steering ratio according to the steering ratio characteristic.

* * * * *